US008213601B2

(12) United States Patent
Zuili

(10) Patent No.: US 8,213,601 B2
(45) Date of Patent: Jul. 3, 2012

(54) FONT LEVEL ENCRYPTION METHOD AND APPARATUS

(76) Inventor: Patrick Zuili, Boca Raton, FL (US)

( * ) Notice: Subject to any disclaimer, the term of this patent is extended or adjusted under 35 U.S.C. 154(b) by 1143 days.

(21) Appl. No.: 10/360,270

(22) Filed: Feb. 7, 2003

(65) Prior Publication Data

US 2004/0156501 A1 Aug. 12, 2004

(51) Int. Cl.
*G06F 21/00* (2006.01)
(52) U.S. Cl. ......................................................... 380/28
(58) Field of Classification Search .................... 380/45, 380/277, 284–285, 28
See application file for complete search history.

(56) References Cited

U.S. PATENT DOCUMENTS

| | | | | |
|---|---|---|---|---|
| 4,987,550 | A * | 1/1991 | Leonard et al. ................ | 715/205 |
| 5,220,606 | A * | 6/1993 | Greenberg ...................... | 380/43 |
| 5,539,827 | A * | 7/1996 | Liu .................................. | 380/37 |
| 5,680,452 | A * | 10/1997 | Shanton ........................ | 713/167 |
| 6,049,608 | A * | 4/2000 | Ablowitz et al. ............... | 380/28 |
| 6,178,243 | B1 * | 1/2001 | Pomerantz et al. ........... | 380/243 |
| 6,640,303 | B1 * | 10/2003 | Vu .................................. | 713/171 |
| 7,016,497 | B2 * | 3/2006 | Henson et al. ................. | 380/277 |
| 7,069,591 | B1 * | 6/2006 | Weicher .......................... | 726/26 |
| 7,194,624 | B1 * | 3/2007 | Harris ............................ | 713/167 |
| 2002/0095604 | A1 * | 7/2002 | Hausler .......................... | 713/201 |
| 2002/0112183 | A1 * | 8/2002 | Baird et al. .................... | 713/201 |
| 2002/0159588 | A1 * | 10/2002 | Kauffman et al. ............. | 380/28 |

OTHER PUBLICATIONS

Caronni et al., "Skip—Securing the Internet", 1996, pp. 62-67, obtained from IEEE.*
Aziz et al., "Design and Implementation of SKIP", 1995, pp. 1-12.*
Schneier, Bruce, "Applied Cryptography", Second Edition, 1996, pp. 587.*

* cited by examiner

*Primary Examiner* — Jeffrey D Popham

(57) ABSTRACT

This invention improves upon the existing art by implementing encryption at the "font level," thereby, in affect, protecting each independent small portion of a text file or image file. Such a capability offers enormous advantages, including the protection of subparts of a data file from the remainder of the information to be protected, such that a would-be hacker able to decode one of the constructs of the font level would not be able to unscramble the entire text file or image file. In the preferred embodiment, the font encryption system is provided as a plug-in improvement to the existing operating system, thereby facilitating streaming encryption on the fly in a manner which is transparent to the end user. That is to say, in contrast to existing modalities, use of the improved technique would not require deep "hooks" into the computer file system or file-sharing system. Overall, the improvement permits full digital rights management control over each device interface to the font-level encryption capability, allowing operatings such as click and drag, cut and paste, and so forth, to take advantage of the added security while maintaining a streamlined and easy to use user interface.

22 Claims, 3 Drawing Sheets

FONT LEVEL ENCRYPTION METHOD AND APPARATUS

FIELD OF THE INVENTION

This invention relates generally to personal computing, network computing, and the like, and, more particularly, to an encryption methodology that operates at the font-level, thereby providing a more portable and stronger form of security.

BACKGROUND OF THE INVENTION

Needless to say, numerous types of encryption systems and methods have been developed, many of which are in commercial use, and many of which have also been patented. One problem with existing encryption systems is that an entire document, graphical image, and so forth, is encrypted in its entirety, such that if a hacker were to determine the key or keys necessary to unscramble the code, a serious security breach could result.

Reference is made to FIG. 1, which shows an existing environment associated with personal computing, network computing, and the like. In this typical situation, computer 102 including human-interface devices such as keyboard 104, interacts with application programs 106 through an operating system 110. Utilizing such a system, fonts are generated utilizing numerical values 112 and/or graphical values 114, enabling the O/S 110 to obtain fonts utilizing generators such as postscript, and the so forth, for use by the application 106. Again, as mentioned above, encryption takes place once an entire textual or graphical document is generated, using a key which, if identified, would enable the entire work produce to become exposed.

SUMMARY OF THE INVENTION

This invention improves upon the existing art by implementing encryption at the "font level," thereby, in affect, protecting each independent small portion of a text file or image file. Such a capability offers enormous advantages, including the protection of subparts of a data file from the remainder of the information to be protected, such that a would-be hacker able to decode one of the constructs of the font level would not be able to unscramble the entire text file or image file.

In the preferred embodiment, the font encryption system is provided as a plug-in improvement to the existing operating system, thereby facilitating streaming encryption on the fly in a manner which is transparent to the end user. That is to say, in contrast to existing modalities, use of the improved technique would not require deep "hooks" into the computer file system or file-sharing system.

Overall, the improvement permits full digital rights management control over each device interface to the font-level encryption capability, allowing operatings such as click and drag, cut and paste, and so forth, to take advantage of the added security while maintaining a streamlined and easy to use user interface.

DETAILED DESCRIPTION OF THE INVENTION

Figure 1:
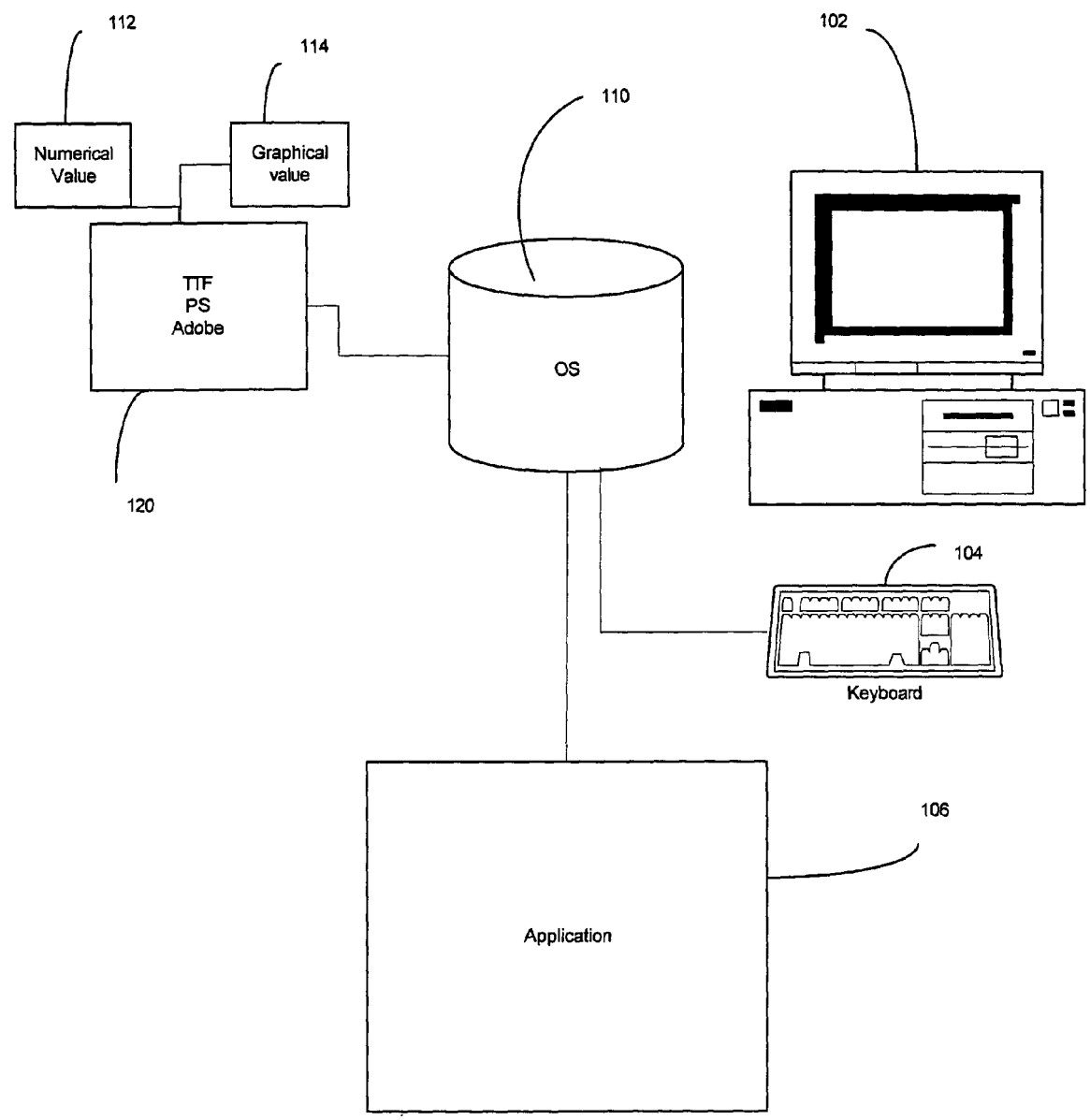
FIG. 1 is a diagram that indicates the way in which components currently interact as part of a prior-art personal computing or network computing environment.
Figure 2:
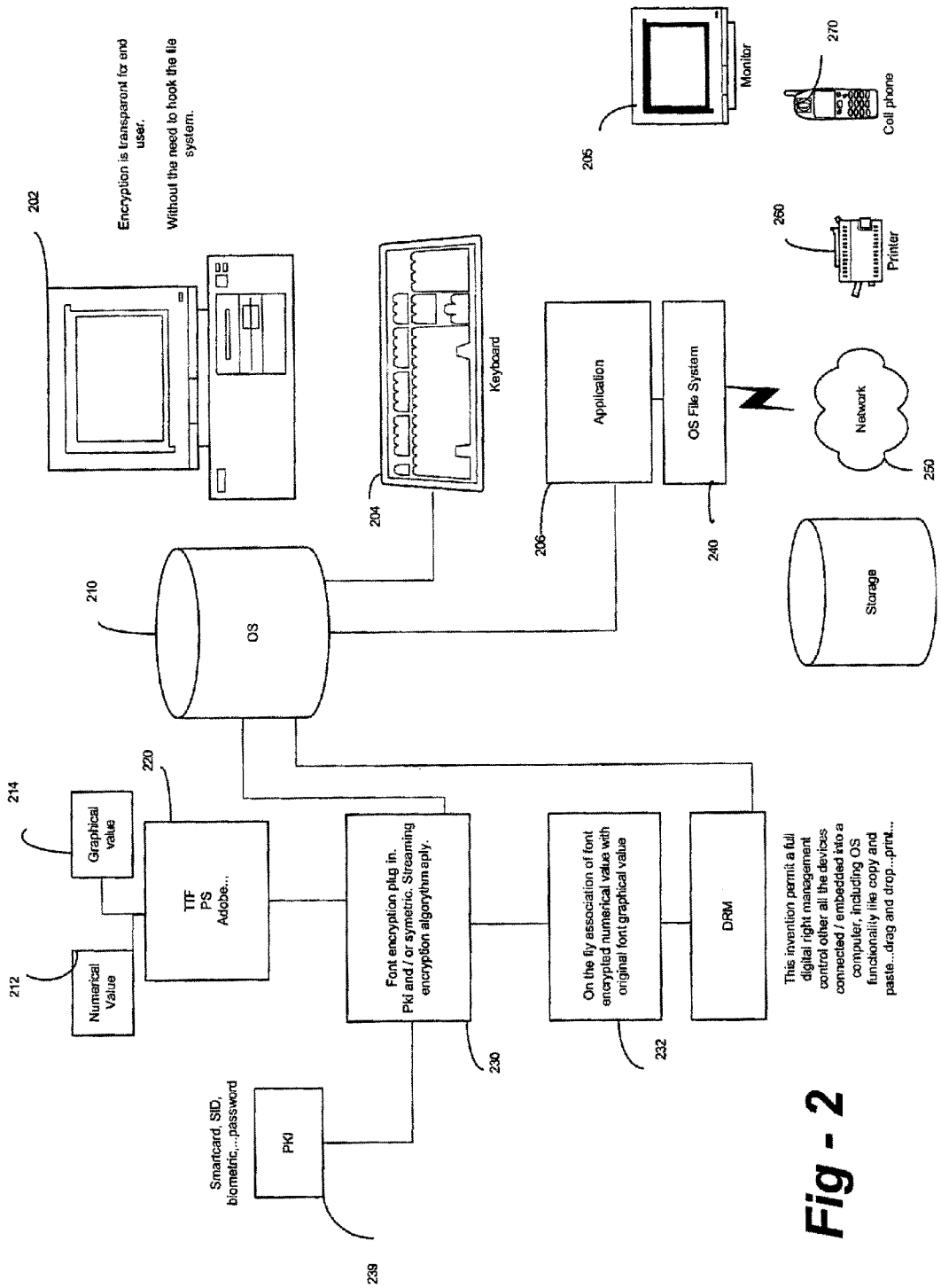
FIG. 2 is a diagram which shows the added subsystems and/or functional operations included in the preferred embodiment of this invention.
Figure 3:
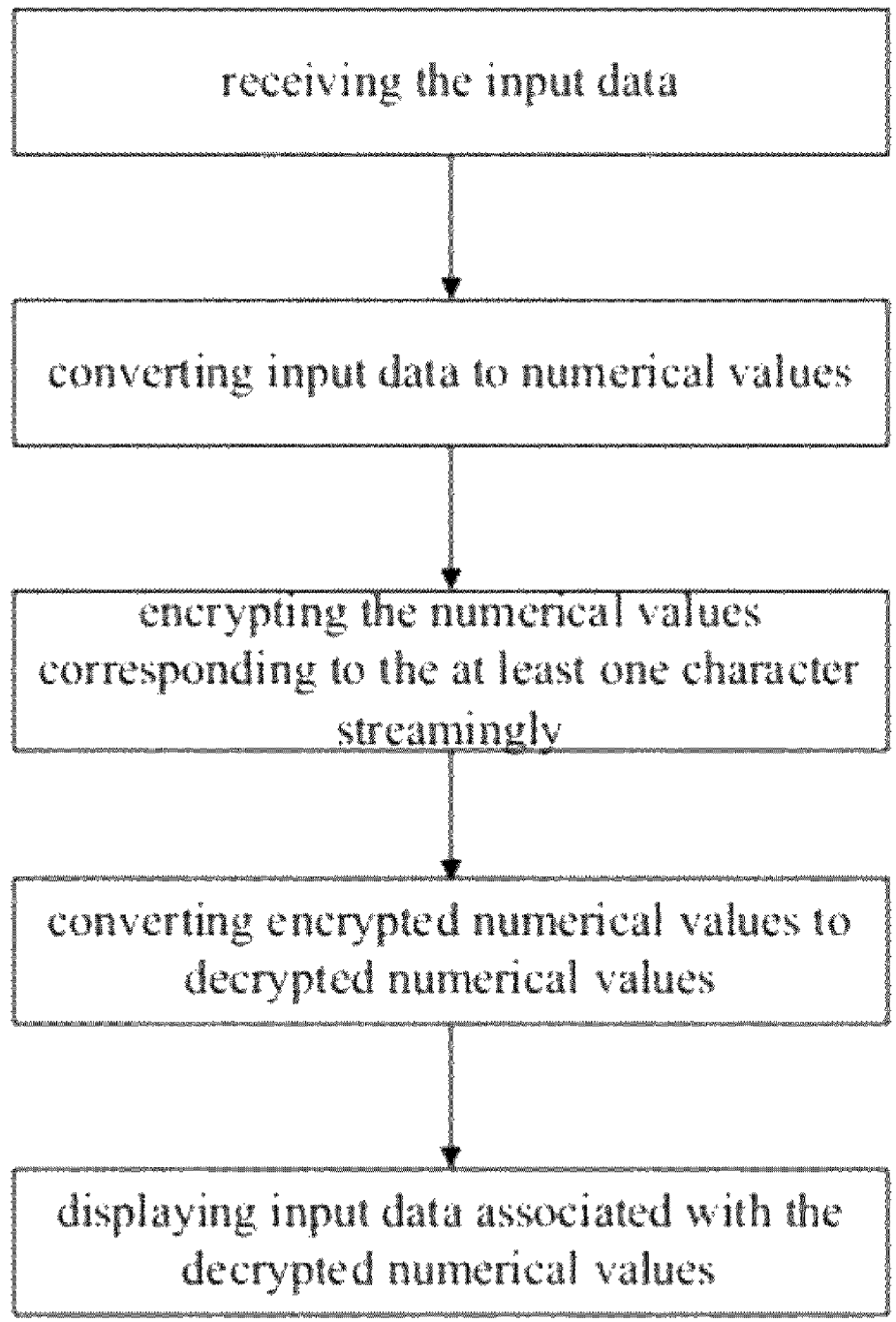
FIG. 3 is a flowchart which shows a method for encrypting at least a font for an enhanced-security.

Having discussed the prior-art arrangement of FIG. 1, reference is now made to FIG. 2, which is a simplified diagram illustrating a preferred embodiment of the present invention. As with typical arrangements, the environment includes some type of platform 202 interfaced to a user input device such as keyboard 204. Operating system 210 is conventionally responsible for interactions between the hardware platform and processing required for interacting with an application 206.

It is important to note that this invention is not limited to any particular operating system, in that Windows, MacIntosh, Linux, Unix and other single- and multi-user operating systems are accommodated. Additionally, the invention is not limited in terms of the "application," in that any type of word processor, spreadsheet, browser, and so forth, whether intended for local or dedicated use, or shared, network implementations.

Accordingly, in FIG. 2, the application 206 is shown coupled to an operating file system 240 which, in turn, may interface to a network 250, be it local area or wide-area, as would be the case with the Internet and storage. (Support for this amendment is found in FIG. 2).

In a network computing environment, the invention is not limited in terms of the devices with which it might interface for communication capabilities. Accordingly, although O/S file system 240 is shown to interface with network 250, it will be appreciated by those of skill in the art of network computing, mobile computing, and the like, that other devices such as printer 260, cellular telephone, and/or additional peripheral devices such as monitor 205 may take advantage of the invention as well.

Referring now to the software than the hardware of the computing environment, operating system 210 interfaces with a font encryption plug in 230, an element which is not found in prior-art encryption implementations. This plug in 230 is interposed between a font-generating block 220, which may utilize numerical values 212 or graphical values 214 and block 232, which provides a real-time association with an encrypted font and a version of the original value.

In the preferred embodiment, the font encryption plug in 230 interfaces to some form of key cryptography system depicted with block 239. The block 239 may utilize any known or yet-to-be-developed encryption algorithm, including public/private keys, whether asymmetric or symmetrical in nature. Importantly, given this flexibility, the invention facilitates the use of streaming encryption algorithms as opposed to batch processing.

The key generator 239 is not limited in terms of the way in which security data are used for key generation purposes, in that a smart card, biometric data or password protection, or some combination thereof, may be utilized in accordance with the invention.

In the preferred embodiment, the font is encrypted with a numerical value provided through key generator 239 and block 230, which, in turn, is associated with the original font graphical value, enabling a progressive, streaming decryption of the font-level information to be recovered by an authorized recipient. Accordingly, the invention affords full digital rights management control over all devices connected to it, regardless of hardware, software, or platform compatibility.

As a final note, although the expression "font-level" is used in this description, the invention is not limited to alphanumeric values, per se, but is broadly applicable to any system wherein relatively small discrete units are used by an application for textual or graphical processing. As such, the invention is compatible not only with "ASCII"-type font level codes, but encapsulated postscript (EPS), packetized communications, frame-based transmissions, and so forth.

I claim:

1. A method for encrypting at least a font for an enhanced-security, comprising the steps of:
generating at least the font with font values, wherein font values are entities that have an original font numerical value and an associated original font graphical value;
encrypting the original font numerical value with a numerical value;
associating the encrypted font numerical value directly without any other intermediate steps during the association with the original font graphical value in real time for streaming encryption of the font on the fly; and
generating at least an encryption key by utilizing a key generation algorithm,
wherein the encryption occurs before a document is formed by an application, wherein each font is individually encrypted before being represented as a cipher text or before forming a plaintext, wherein an encrypted representation of the original font graphical value is decrypted upon authentication by an authorized recipient such that the authorized recipient being able to view plaintext data even after the decryption while unauthorized entities are unable to view plaintext data, wherein an operating system interfaces with a font encryption plug-in module and the application to protect each independent font in a manner which is transparent to the authorized recipient.

2. The method of claim 1, wherein the font encryption plug-in module is interposed between a font-generating module and an associating module for encrypting font numerical values associated with fonts generated by the font generating module before the fonts are provided to the application for forming the document, and wherein the association module provides the real-time association of the encrypted font numerical value with the associated original font graphical value.

3. A font-level encryption system for encrypting a font for enhanced-security, comprising:
a computing device having a processor and a storage unit;
a font generating module configured to generate at least a font with font values, wherein font values are entities that have an original font numerical value and an associated original font graphical value;
a key generator capable of utilizing at least a key generation algorithm to generate at least an encryption keys based on security data;
a font encryption plug-in module configured to encrypt the original font numerical value with a numerical value, wherein the encryption occurs before a document is formed by an application; and
an association module configured to associate the encrypted font numerical value with the original font graphical value in real-time for streaming encryption of the font on the fly;
wherein an encrypted representation of the original font graphical value is decrypted upon authentication by an authorized recipient such that the authorized recipient being able to view plaintext data even after the decryption while unauthorized entities are unable to view plaintext data, wherein an operating system interfaces with the font encryption plug-in module and the application to protect each independent font in a manner which is transparent to the authorized recipient.

4. The font-level encryption system of claim 3, wherein the encryption key is derived from security data obtained from one of a smartcard, biometric data, SID, password protection or any combination thereof.

5. The font-level encryption system of claim 3, wherein the encryption key includes a symmetric key, an asymmetric public key, an asymmetric private key, or streaming encryption algorithm key.

6. The font-level encryption system of claim 3, wherein the association module provides the authorized recipient with an authorization for decrypting the original font by separating the associated original font graphical value from the encrypted font numerical value based on digital rights management.

7. The font-level encryption system of claim 3, wherein the font encryption plug-in module is operative to encrypt fonts of textual data associated with an application program in a streaming format.

8. The font-level encryption system of claim 3, wherein the original font graphical value is decrypted remotely at one of a remote computer, at a telephone, at a network printing device, or any combination thereof by the authorized recipient.

9. The font-level encryption system of claim 3, wherein the font includes one of a character, each independent portion of an image, each independent portion of a graphic, each independent input data, each independent portion of a document or any combination thereof.

10. The font-level encryption system of claim 3, wherein the original font value includes one of alphanumeric values, small discrete units used by the application for textual and graphical processing, ASCII-type font level codes, ANSI-type font level codes, packetized communications, frame-based transmissions, or any combination thereof.

11. The font-level encryption system of claim 3, wherein the application includes any one of a word processor, a spreadsheet, a browser, shared network implementations.

12. The font-level encryption system of claim 3, wherein the operating system interfaces to a plurality of computing devices including network computing, mobile computing, printer, cellular telephone, and peripheral devices including a monitor, through a network which includes a local area network (LAN), a wide area network (WAN), an intranet, and the Internet.

13. An encryption apparatus for protecting a font from unauthorized access, comprising:
at least a computing device having a processor for processing the font with font values, wherein font values are entities that have an original font numerical value and an associated original font graphical value;
an encryption plug-in module interposed between a font-generating module and an associating module for encrypting the font before the fonts are provided to an application for forming a document, wherein the association module is configured to associate an encrypted font numerical value with an original font graphical value for real time streaming encryption of the font on the fly before the document is formed by the application, to protect each independent font in a manner which is transparent to an authorized recipient; and
a key generating module capable of generating font encryption keys, wherein a representation of the original font graphical value is decrypted upon authentication by the authorized recipient such that the authorized recipient being able to view plaintext data as encrypted even after the decryption while unauthorized entities are unable to view plaintext data.

14. The encryption apparatus of claim 13, wherein the decryption of the encrypted font is performed by separating the original font graphical value from the encrypted font numerical value.

15. The encryption apparatus of claim 13, wherein the encrypted font numerical value is associated with the original font graphical value for enabling a progressive, streaming decryption of the encrypted font to be recovered by the authorized recipient.

16. The encryption apparatus of claim 13, wherein the original font graphical value is decrypted remotely at one of a remote computer, at a telephone, at a network printing device, or any combination thereof by the authorized recipient.

17. The apparatus of claim 13, wherein the encryption key is derived from security data obtained from one of a smart-card, biometric, SID, password protection, or any combination thereof.

18. The encryption apparatus of claim 13, wherein the computing device is coupled with an input device selected from the group consisting of keyboard and network interface to receive the font.

19. The encryption apparatus of claim 13, wherein the font value includes alphanumeric values, small discrete units used by an application for textual and graphical processing, ASCII-type font level codes, ANSI-type font level codes, packetized communications, frame-based transmissions, and any combination thereof.

20. A method for encryption of input data, comprising the steps of:
    receiving input data into a computing device from an input device, wherein the input device includes a keyboard, wherein the input data comprising at least one character;
    converting input data to numerical values;
    encrypting the numerical value before forming a document corresponding to the at least one character in real time, wherein the encryption occurs before the document is formed by an application;
    converting the encrypted numerical values to decrypted graphical values; and
    displaying the input data associated with the decrypted graphical values to an authorized recipient,
    wherein a representation of the associated graphical value is decrypted upon authentication by an authorized recipient such that the authorized recipient being able to view plaintext data even after the decryption while unauthorized entities are unable to view plaintext data.

21. The method of claim 20, wherein said method is capable of implementing on a plurality of operating systems including Windows, Macintosh, Linux, Unix and other single- and multi-user operating systems.

22. The method of claim 20, wherein said method is capable of providing full digital rights management control over a plurality of devices connected to a computer including operating system functionality including one of copy, paste, drag, drop, print, or any combination thereof.

* * * * *